United States Patent [19]

Feil et al.

[11] Patent Number: 4,462,953

[45] Date of Patent: Jul. 31, 1984

[54] PROCESS FOR THE MANUFACTURE OF POLYESTER FILM

[75] Inventors: Joseph N. Feil, Akron; Anthony P. Albert, Canton, both of Ohio

[73] Assignee: The Goodyear Tire & Rubber Company, Akron, Ohio

[21] Appl. No.: 382,760

[22] Filed: May 27, 1982

[51] Int. Cl.³ .............................................. B29D 7/06
[52] U.S. Cl. ................... 264/564; 264/566; 264/569
[58] Field of Search ................ 264/564, 563, 569, 566

[56] References Cited

U.S. PATENT DOCUMENTS 2,556,295 6/1951 Pace, Jr. ............................ 264/567
2,578,899 12/1952 Pace, Jr. ............................ 264/567
2,844,846 7/1958 Kronholm .
3,950,469 4/1976 Gneuss et al. ..................... 264/564
4,010,222 3/1977 Shih ................................... 264/564
4,252,512 2/1981 Kornylak ..................... 425/DIG. 2

Primary Examiner—Donald E. Czaja
Assistant Examiner—Mary A. Becker
Attorney, Agent, or Firm—Alvin T. Rockhill

[57] ABSTRACT

The invention contemplates the manufacture of a wrinkle-free, amorphous, unoriented polyester film which is produced by an extrusion blowing process. The process consists of extruding a bubble of polyester, expanding the bubble, and then collapsing the bubble at a temperature above the polyester's glass transition temperature to prevent the formation of wrinkles. The collapsing step is effected through the use of a shroud which receives the bubble and has a low friction surface.

4 Claims, 3 Drawing Figures

PROCESS FOR THE MANUFACTURE OF POLYESTER FILM

TECHNICAL FIELD

The invention herein lies in the art of polyester films. Specifically, a substantially amorphous, unoriented, wrinkle free film is produced through a process for continuously extruding, expanding, and collapsing a polyester bubble.

BACKGROUND ART

Heretofore, processes have been known for producing films of thermoplastic polyesters by continuous melt extrusion through an annular die, expansion (blowing) of the film to produce a bubble and subsequent collapse and pressing of the film to produce a seamless, flattened tube. Such processes generally require an additional step which either heats or stretches the pressed film to remove wrinkles. Wrinkling occurs because various sections of the bubble diameter travel differing distances from their uncollapsed state to the flattened tube state. While post-stretching of the tube removes wrinkles, it can also cause orientation of the molecular chain structure of the polymer which may affect the film's physical properties. While often times molecular orientation is desirable, there are applications in which an unoriented film is needed. Thus, there is a need in the art for a method for producing an amorphous, unoriented polyester film which simultaneously utilizes the production advantages of extrusion blowing.

U.S. Pat. No. 2,461,975 to Fuller relates to a process for producing seamless tubing from thermoplastic organic materials. The process includes extruding through an annular die, inflating the thermoplastic material, then collapsing the material between two large pinch rolls. Expansion is preferred near the die but may occur at any point before the pinch rolls. There is no specific mention of the use of polyester as a thermoplastic material and, consequently no discussion of the extrusion of amorphous, unoriented polyester film.

U.S. Pat. No. 2,632,206 to Pierce describes a film producing apparatus similar to Fuller, having a novel gaseous cooling medium. U.S. Pat. No. 2,844,846 to Kronholm describes the use of rotatable pinch rollers to reduce wrinkling and irregularities in the collapsed film. Neither of these patents discuss a means to produce wrinkle-free, unoriented and amorphous polyester film.

U.S. Pat. No. 2,947,031 to Ho Chow, et al refers to a method for uniform cooling of the blown polyester by oscillating a cooling ring. A film having a more uniform thickness is thereby produced. U.S. Pat. No. 2,862,234 to Gerber relates to a means for introducing expanding fluid through a tubular probe passing through nip rolls which compress and seal the film. The nip rolls may be grooved to provide for passage of the probe. Neither of these patents teach applicants' invention.

U.S. Pat. No. 2,823,421 to Scarlett relates to stretching of polyethylene terephthalate film. The film is biaxially oriented by extrusion followed by stretching at least at a rate of 400% per minute. The invention does not teach the use of extrusion followed by blowing of the film. It therefore is not pertinent.

U.S. Pat. No. 2,955,318 to Cook, et al teaches a method and apparatus for collapsing thermoplastic tubing. The tubing is molecularly oriented. Since applicant teaches the use of substantially unoriented polyester film, this patent also is not pertinent.

U.S. Pat. No. 3,141,912 to Goldman, et al relates to the orientation of thermoplastic polymeric film in tubular form. A novel method of maintaining the desired temperature during expansion is described which provides a process for orienting such film. Similarly, U.S. Pat. Nos. 3,231,642 and 3,231,643 also to Goldman, et al relate to controlled heating and cooling to obtain proper orientation. Since the present invention teaches the use of amorphous, unoriented polyester film, these patents are not pertinent.

U.S. Pat. No. 3,142,092 to Ralston, teaches an apparatus for extruding molten polymers through an annular die having a mandrel which cools the molten polymer by means of a fluid such as water. The advantages of this patent over the prior art allegedly include elmination of squeeze rolls to seal the tube after it has been cooled. U.S. Pat. No. 3,257,489 to Heffelfinger discloses a process for heat treating previously molecularly oriented film by heating to at least about 100° C. and exerting on the film a positive stretching action. The result is a film having a more uniform gauge. Neither of these patents are pertinent in that they do not teach the elmination of wrinkles in amorphous, unoriented polyester film.

U.S. Pat. Nos. 3,231,652 and 3,231,653 to Goldman and 3,725,519 to Seifried, et al all relate to orienting tubular film and thus do not teach the production of unoriented, amorphous film, as does the present invention. U.S. Pat. No. 3,335,208 to Harris relates to a process for producing thin walled plastic tubing. The uniformity of extruded film thickness is controlled by the selective application of heat to the die. There is no indication or teaching that amorphous, unoriented polyester film is produced which is wrinkle-free. U.S. Pat. No. 3,544,667 to Ebert, et al, relates to extruded thermoplastic tubes which are first cooled in a pressure zone and then heated and inflated in a second zone to provide desired biaxial orientation. Because the film is oriented, the patent is not pertinent.

U.S. Pat. No. 3,725,519 to Seifried, et al relates to a two step process for the orientation of a tubular film of polyethylene terephthalate. The die is directed downward and a coolable core which controls the dimensions and the temperature of the polyester tube is positioned downstream. No mention is made of unoriented, wrinkle-free polyester film.

U.S. Pat. No. 3,880,974 to Nohtomi, relates to simultaneous biaxial orientation and stretching of polyethylene terephthalate. U.S. Pat. No. 4,201,741 to Pannenbecker, relates to a process for controlling the manufacturing blown films, particularly polyethylene. His theories of measuring stations control air pressure in the bubble, the diameter of the bubble, and the amount of cooling air applied to the outside of the bubble. Neither of these patents teach the production of an unoriented, amorphous, wrinkle-free polyester film.

British Pat. No. 812,387 to Adams, directly addresses the problem of the formation of wrinkles as a thermoplastic film is collapsed. However, this invention removes wrinkles by an additional heat treatment step. Since the present invention teaches a process for the direct production of *wrinkle-free* film which is amorphous and unoriented, this patent disclosing the *removal* of wrinkles which have already formed by a process is not pertinent.

DISCLOSURE OF INVENTION

It is an aspect of the present invention to provide a process for making a wrinkle-free polyester film via a blown film process.

It is another aspect of the present invention to provide a process, as above, wherein the polyester film produced is substantially amorphous and unoriented.

It is yet another aspect of the present invention to provide a process, as above, in which processing time and energy costs are reduced.

It is still another aspect of the present invention to provide a process, as above, in which films can be made of various copolyesters.

It is yet another aspect of the present invention to provide a process, as above, which produces wrinkle-free polyester film without utilizing a post-heat treatment step.

These aspects and others which will become more apparent as the detailed description proceeds, are achieved by: a process for producing wrinkle-free polyester film, comprising: continuously melt extruding polyester through an annular die to form a bubble; simultaneously quenching and rapidly expanding said polyester bubble to a substantially larger diameter; collapsing said bubble through a shroud; said polyester bubble being expanded and collapsed at a temperature above its glass transition temperature.

In general, a wrinkle-free polyester film, comprising: the film made by a process comprising: continuously melt extruding polyester through an annular die to form a bubble; simultaneously quenching and rapidly expanding said polyester bubble to a substantially larger diameter; collapsing said bubble through a shroud; said polyester bubble being expanded and collapsed at a temperature above its glass transition temperature.

BRIEF DESCRIPTION OF DRAWINGS

To more fully understand the objects, techniques, and structure of the invention, reference should be made to the following detailed description and accompanying drawings, wherein.

BEST MODE FOR CARRYING OUT THE INVENTION

The present invention provides for the production of unoriented, amorphous (uncrystallized) polyester film which heretofore could not be produced using prior art blowing processes. It has been discovered that by the use of certain low friction bubble collapser designs, it is possible to collapse a molten polyester film, that is a polyester at or above its glass transition temperature, without adherence to the collapser. In doing so, the film remains free of wrinkles by reason of its molten state. Processing time and energy costs are reduced in that there is no need for reheating or stretching the polymer after collapse.

Figure 1:
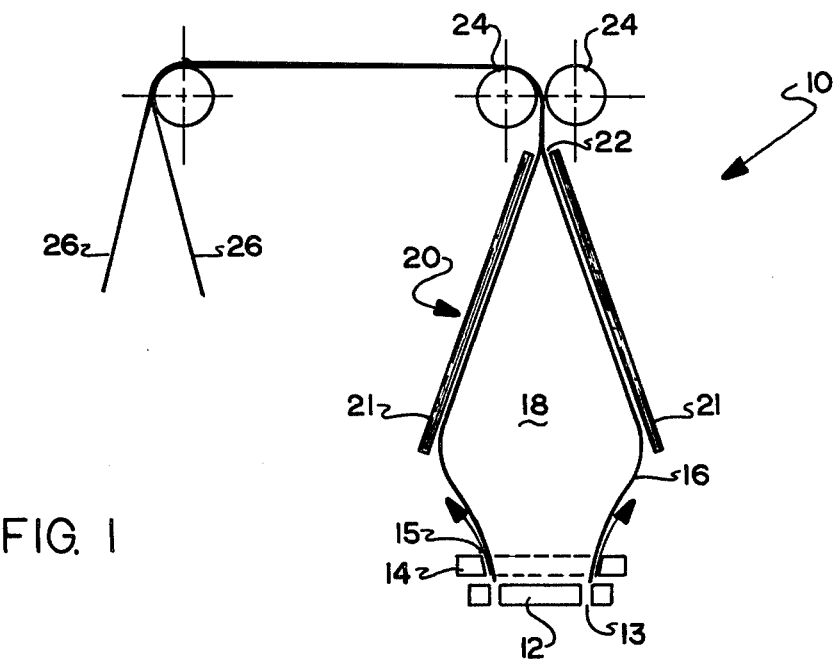
FIG. 1 is a schematic view of the process of the invention.

The process is illustrated in FIG. 1 wherein a schematic representation of the process is designated by the number 10. The molten polyester is extruded through a circular die 12 having an annulus 13. Positioned immediately above die 12 is an air ring 14 having an annulus 15 through which passes a stream of air or inert gas. The molten polyester is cooled by the air or gas such that its viscosity increases to produce an acceptable melt strength. A stationary fluid bubble 18 of air or inert gas is located above the air ring and within the interior volume of the tubular polyester bubble 16.

As the polyester, usually polyethylene terephthalate or a copolymer thereof, is continuously extruded through the die 12, it is expanded by the fluid bubble 18 and then collapsed by means of a shroud 20. The interior angle of the shroud may vary from 10 to 70 degrees with from 15 to 60 degrees preferred. The polyester then passes through a slit 22 located at the apex of the shroud 20 and is thereafter pressed by means of nip rolls 24. The polyester may then be wound or, as shown in FIG. 1, cut to form separate film sheets 26.

As discussed above, the polyester is maintained at a temperature at or above its glass transition temperature throughout the extrusion, expansion and collapsing steps. The actual temperature is thus determined by the glass transition temperature of the particular polyester used. For example, if polyethylene terephthalate (PET) is used, it is maintained at its 70° C. glass transition temperature or higher. Copolymers of PET such as ethylene terephthalate/isophthalate (ET/I) may be processed at a somewhat lower temperature owing to the lower glass transition temperature of the copolymer. The polyesters which may be utilized in the present invention are limited, however, to those having an intrinsic viscosity (I.V.) of between about 0.68 and 2.0, with between about 0.7 and 1.1 preferred. Intrinsic viscosity is measured in a 60% phenol/40% tetrachloroethane solvent. Polyesters having I.V.'s of less than about 0.68 do not have the requisite melt strength at temperatures above the glass transition temperature and thus are not capable of forming films at these temperatures.

The melt viscosity of the polyester must be at least 5,000 poise (500,000 cp) and ranges as high as 50,000 poise (5,000,000 cp) provided extrusion equipment is available to handle such material. The melt viscosity is preferably between about 10,000 and 30,000 poise.

Polyesters which may be used in the invention include the reaction products of dicarboxylic compounds and diols. Examples of carboxylic compounds include alkyl dicarboxylic acids having from 4 to 12 carbon atoms, aryl or alkyl substituted aryl dicarboxylic acids having from 8 or 9 to 16 carbon atoms, dicarboxylic acid esters such as alkyl dicarboxylic esters having from 6 to 20 carbon atoms and aryl and alkyl substituted aryl dicarboxylic acid esters having from 10 to 20 carbon atoms. Diols include alkyl diols having from 2 to 12 carbon atoms, such as ethylene glycol. Random or block copolyesters may also be utilized comprising the reaction products of combinations of the above dicarboxylic compounds and/or combinations of the diols. Desirable polyesters are copolymers of polyethylene terephthalate, while polyethylene terephthalate homopolymer is preferred.

The construction of the shroud 20 has been found to be critical to the operation of the invention. Many conventional, prior art collapsing devices cannot adequately dissipate the heat which is transferred from the molten polyester bubble as it comes in contact with the collapser. As the temperature of the conventional collapser approaches that of the molten polyester, the latter becomes adherent at the points of contact therewith. This causes friction and subsequent instability of the film bubble and thereafter disruption of the continuous blowing process. This problem is not of significance in conventional, prior art processes because, when the temperature of the film is maintained below the $T_g$, the polymer is much less tacky and more viscous.

Shroud 20 comprises a pair of surfaces 21 which may be curvate or planar, with planar being preferred. The construction of the shroud must be such that the combined effect of heat build-up and surface friction is below the threshold level which will cause adherence of the polyester. One material which has unexpectedly been found to be satisfactory in this regard is thin paperboard. In particular, a pair of flat wax impregnated paperboard sheets are positioned to form an inverted "V". The paperboard is sufficiently thin to allow rapid heat dissipation from the contacting surface and is generally between about 10 and 45 mils thick. The back of the paperboard may be reinforced by conventional means, such as ribbing or wooden slats, as long as sufficient surface area on the back of the paperboard is exposed to ambient air to maintain adequate heat dissipation.

Figure 3:
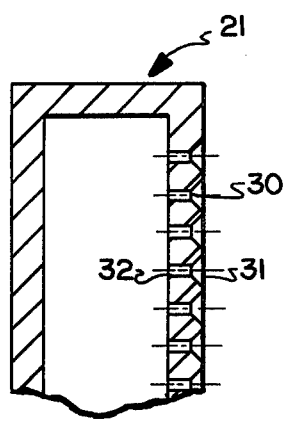
FIG. 3 is a cross-sectional view of the design of the apertures in the shroud of the invention.
Figure 2:
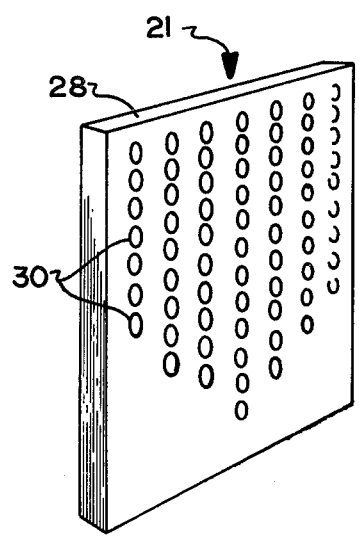
FIG. 2 is an isometric view of the shroud of the invention.

The highly preferred shroud surface is that shown in FIGS. 2 and 3, wherein surface 21 comprises a plate 28 having a plurality of apertures 30 on the surface which contacts the polyester bubble. Plate 28 is hollow with apertures 30 communicating with said hollow portion. A source of fluid pressure, most commonly an airhose, (not shown), is connected to a fluid inlet (not shown) positioned on the plate 28. Fluid pressure is then applied to the plate and the fluid is forced out apertures 30. As shroud 20 receives the polyester bubble 16, the fluid eminating from apertures 30 provide a cushion between polyester bubble 16 and the surface of plates 28. This cushion provides both a low-friction passage for the polyester bubble and prevents excessive heat build-up on the plates. Apertures 30 may have a taper such that the outer surface diameter 31 of the aperture is greater than the inner surface diameter 32. The taper aids in dispersion of the fluid along the surface of the plate 21 which contacts (or is in close proximity to) the polyester bubble.

The number and size of apertures 30 may be determined readily by one skilled in the art and is such as to barely keep the polyester bubble 16 from physically contacting plates 28. The degree of cushioning, of course, is also determined by the fluid pressure applied to the plate 28. The fluid pressure which is optimum can readily be determined by those skilled in the art without undue experimentation and is usually no more than a few PSI above atmospheric. Generally, the fluid is at ambient temperature, but may be heated or cooled in order to partially control the temperature of the polyester bubble 16. The size of the plates 28 is determined by the diameter of the polyester bubble, and generally has a width equal to or slightly larger than the lay-flat width of the tube collapsed from bubble 16. As can be seen from FIG. 2, the apertures 30 form a "V" shape, which is that portion of the plate which actually collapses the polyester bubble. There is no need for apertures at other points on the plate.

It will be appreciated that other collapsing devices can be used which provide a low friction surface. For example, aluminum plates may be used having internal cooling means so that the surfaces which contact the polyester bubble are cool enough to prevent sticking of the polyester bubble thereto. As with the paperboard shroud described earlier, aluminum or other metallic plates come in actual contact with the polyester bubble, unlike the plate 28 which provides an air cushion between the bubble and the plate.

In most applications, it has been found that the height of the polyester bubble 16 may be controlled to prevent excessive heat loss which would lower the temperature of the film below the glass transition temperature. Alternatively, but less preferred, heating means may be applied to the polyester bubble 16 to maintain the proper temperature, e.g., an infrared or resistance heater.

In general, the polyester bubble 16 is maintained at a temperature of between 0° and 30° C. above the glass transition temperature, and preferably between about 10° and 25° C. above the $T_g$. Higher temperatures may result in partial crystallization.

The temperature of the collapsed film as it leaves slit 22 is a function of the thickness of the polyester bubble 16, the temperature and rate of flow of the cooling fluid from ring 14, and lastly the temperature of the molten polyester as it is extruded through die 12. Manipulation of these variables as the processing conditions require is well known to those skilled in the art and as such will not be discussed in detail herein. In general, the thicker the film and the faster the polyester throughput, the higher will be the temperature of the bubble and therefore the greater its required height. The width of annulus 13 generally varies between 0.020 and 0.040 in. Generally, the polyester is expanded to between about 1 and 5 times the diameter as extruded with between about 1 and 4 preferred. Naturally, as the expansion ratio (blown to unblown film) is increased, the thickness of the bubble 16 decreases for a given polyester throughput.

After the polyester bubble 16 has been collapsed and passes through slit 22, it is pressed between nip rolls 24. The nip rolls are constructed of conventional materials, such as steel, chrome steel, rubber and the like, and are usually cooled by appropriate means, for example, water cooling. The cooled nip rolls 24 prevent adherence of the collapsed film to the rolls and also, by lowering the temperature of the collapsed film, prevent the now planar film surfaces from heat sealing or sticking to each other. Generally they are cooled to between about 10° and 40° C. The clearance between the nip rolls 24 is a function of the thickness of the collapsed film.

The unoriented, amorphous polyester film produced by this invention has a variety of applications, such as in coatings for paperboard trays, used in the food industry, among others and as a replacement for cellophane. Because the film has not been oriented and heat set, it may be used as a heat sealable wrapping. The film of the invention may also be used as a packaging means wherein the unoriented, amorphous film is thermoformed onto an item having sufficient hardness such that it permits constrained cooling of the film after forming. In this way, for example, a complex item may be packaged with a film having some of the toughness produced by orientation yet, by reason of the stretch, conforms to the shape of the item.

The following examples illustrate in detail the best mode of the invention.

EXAMPLE I

Polyethylene terephthalate having an I.V. of 1.04 was extruded through a $-\frac{1}{2}$ inch NRM extruder into an annular die at a temperature of 560° F. to be blown "upwards" into a tubular film under the following conditions:

the die annulus diameter was two inches and the annular thickness was 0.030 inches. The collapser used was a shroud consisting of a pair of 14×14 in. hollow aluminum plates positioned to form an A-frame having an interior angle of 20° and a slit width of 0.25 in. at the apex. The base edges of the A-frame were ten inches from the die annulus. The interior faces of the plates each contained 130 apertures having a diameter of 1/32 of an inch and evenly spaced about the faces. Ambient air was used as the cushioning fluid. One pinch roll was constructed of chromed steel and the other was rubber coated. They were cylindrical in shape and positioned parallel to and ⅛ in. above the slit, having a diameter of 2.2 inches and a length of 15 inches. The steel roll was maintained at a temperature of 86° F. by means of interior water cooling. The rubber roll was cooled with dry ice. The wind-up speed was 17.2 feet per minute, and the film gauge was 0.0045 inches (4½ mil).

The polyester was blown to a diameter of 3½ in. giving a blown to unblown ratio of about 7/4 (75% diameter increase) prior to collapse in the A-frame shroud. Air at 40° F. was blown through the air ring located ½ in. above the die. The blown film collapsed smoothly without adherence to the shroud and was easily separable into two sheets after passing through the pinch rolls. The final film, in addition to being wrinkle free, was amorphous and contained only a slight amount of orientation.

EXAMPLE II

Same conditions as Example I except that the shroud was lowered six inches such that the bottom edges were four inches above the die annulus. While the polyester collapsed smoothly to a wrinkle-free film, the lowering of the shroud caused the temperature of the collapsing film to remain too high, which in turn caused heat sealing of the film after passage through the nip rolls. This Example illustrates the importance of film temperature control and shows that there is an upper constraint on film temperature.

EXAMPLE III

Same conditions in Example II except for the following:

The shroud consisted of a pair of paperboard sheets having a thickness of 0.022 inches and forming an A-frame, as above. The wind-up speed was 98.5 feet per minute. The diameter was 11.25 inches, giving a diameter increase of approximately 560%. The polyester through-put rate was 30 pounds per hour giving a film gauge of 0.25 mil. The film collapsed wrinkle-free and was wound-up into a tube state after passing through the pinch rolls. This example illustrates both the use of thin paperboard as a shroud and the effect of film thickness on shroud height. The film of this example was considerably thinner than that of the previous example. The thinner film cooled faster (but still remained above its $T_g$) and thus did not undergo nip roll sealing, even though the shroud was positioned as in Example II.

EXAMPLE IV

The same conditions were used in Example III except that winding speed was 60.5 feet per minute, the tube width was 10 inches, the polymer through-put was 21 pounds per hour giving a final film gauge of 0.5 mils. The polyester had an intrinsic viscosity of 0.72. Wrinkle-free film was produced and collapsed in this example even though a lower molecular weight polyester was used.

It is to be understood that by the term "substantially unoriented and amorphous" it is meant that to one skilled in the art, the polyester is unorientated and also is amorphous, that is, contains less than 10% crystallinity. Based upon a quantitative standard, polyethylene terephthalate made according to the present invention will have a density of less than 1.36 grams per cubic centimeter and preferably a density of less than 1.35 grams per cubic centimeter. Naturally, this figure will vary with the particular type of polyester or copolymer thereof, but in all cases will represent a polyester being substantially amorphous and unorientated.

While in accordance with the Patent Statutes the best mode and preferred embodiments have been disclosed, it is to be understood that the invention is not limited thereto or thereby. Accordingly, for a true understanding of the scope of the invention, reference should be made to the following appended claims.

What is claimed is:

1. A process for producing wrinkle-free polyester film, comprising:
   continuously melt extruding polyester through an annular die to form a bubble; wherein said polyester is the reaction product of a dicarboxylic compound and a diol, said dicarboxylic compound is selected from the group consisting of alkyl dicarboxylic acids having from 4 to 12 carbon atoms, aryl or alkyl substituted aryl dicarboxylic acids having from 8 to 16 carbon atoms, alkyl dicarboxylic acids esters having from 6 to 20 carbon atoms and aryl and alkyl substituted aryl dicarboxylic acid esters having from 10 to 20 carbon atoms; and
   wherein said diols are selected from the group consisting of alkyl diols having from 2 to 12 carbon atoms;
   simultaneously quenching and rapidly expanding said polyester bubble to a substantially larger diameter;
   collapsing said bubble through a shroud; wherein said shroud comprises:
   a pair of hollow plates which receive said polyester bubble, positioned to form an A-frame having a slit at the apex, said A-frame having an interior angle of between 10° and 70°;
   a means for forcing a fluid through a plurality of apertures in said hollow plates;
   wherein said fluid provides a low friction cushion for the passage of said bubble across said plates; and
   wherein said collapsed bubble passes through said slit;
   said polyester bubble being expanded and collapsed at a temperature above its glass transition temperature wherein said collapsed bubble is a flat, wrinkle-free tube, and wherein said wrinkle-free tube is substantially unoriented and amorphous.

2. A process according to claim 1, wherein said fluid is air at an ambient temperature and wherein the temperature of said polyester bubble is between 0° and 30° C. above the glass transition temperature during collapse.

3. A process according to claim 1, wherein said shroud comprises a pair of planar sheets constructed of paperboard positioned to form an A-frame with a slit at the apex.

4. A process according to claim 1, wherein said polyester is polyethylene terephthalate.

* * * * *